June 14, 1938.     L. ZAIGER     2,120,587
WINDSHIELD WIPER BLADE
Filed Oct. 21, 1936
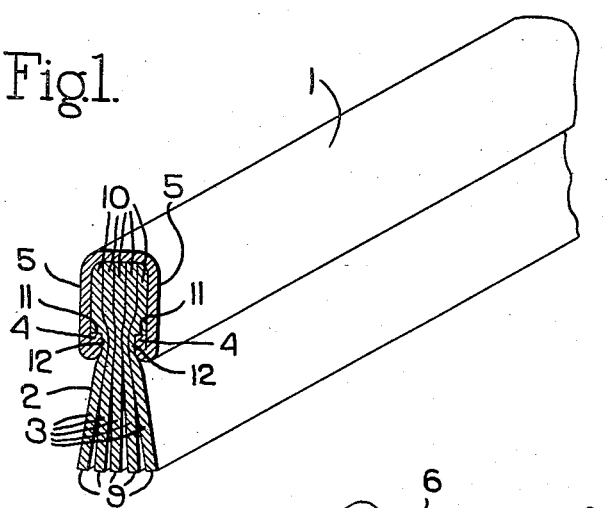
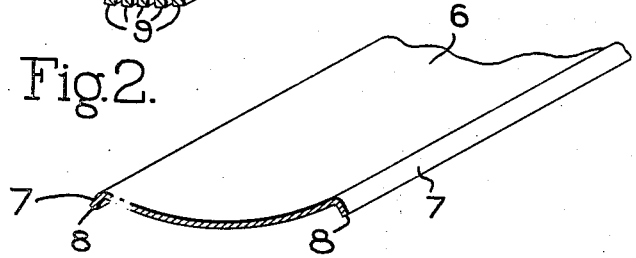
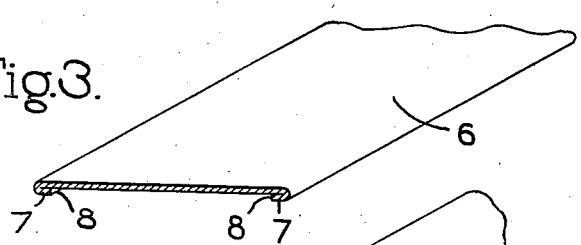
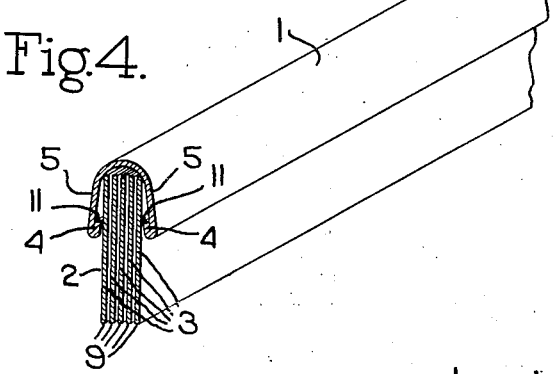
Inventor.
Louis Zaiger
by Heard Smith & Tennant.
Attys.

UNITED STATES PATENT OFFICE 2,120,587

WINDSHIELD WIPER BLADE

Louis Zaiger, Lynn, Mass.

Application October 21, 1936, Serial No. 106,739

1 Claim. (Cl. 15—245)

This invention relates to windshield wiper blades and has for some of its objects to provide a novel wiper blade having improved means for retaining the rubber wiping element in the holder, and also having a wiping element adapted to more efficiently clean the windshield.

The features wherein my invention reside will be more fully hereinafter set forth and then pointed out in the appended claim.

In the drawing;

Fig. 1 is a sectional perspective view of a windshield wiper blade embodying my invention;

Figs. 2, 3 and 4 show different steps in the manufacture of a wiper blade embodying my invention.

My improved wiper blade is of that familiar type comprising a holder or backing member of sheet metal having a U shape in cross section and a flexible wiping element retained in said holder.

In the drawing 1 indicates the sheet metal holder and 2 indicates generally the wiping element. This wiping element may be formed conveniently of a plurality of thin plies or strips 3 of rubber or similar material, and in the construction illustrated there are five such plies or strips, although the number of the plies can be varied without departing from the invention.

The backing or holder 1 has a novel construction which serves not only to increase its grip on the wiping element 2 but which also serves to render the plural-ply wiping element more effective in its wiping action. The backing 1 is made with a narrow rib 4 on the inner face of each side 5 at the edge thereof, these ribs 4 preferably extending the full length of the holder and each presenting a sharp-cornered inwardly facing shoulder.

Said ribs may be formed in any convenient way. One convenient way is illustrated in Figs. 2 to 4 wherein 6 indicates a strip of sheet metal from which the holder 1 is made, said strip having a length corresponding to that of the wiper blade and having a proper width. A narrow portion 7 of each edge 8 of the strip 6 is folded back on the body thereof, as indicated in Fig. 3, thereby producing the rib at each edge of the strip. One way of accomplishing this is to first give the strip the concavo-convex shape shown in Fig. 2 with the edge portion 7 turned up and then to flatten the strip and fold the edges 7 inwardly, as shown in Fig. 3. After the strip 6 has thus been formed with the folded edges 7, then said strip is bent longitudinally into the U shape shown in Fig. 4 with the ribs 4 on the inside thereof. The plies or strips 3 of rubber are then placed in position within the holder 1, as shown in Fig. 4, and the sides 5 of the holder are then pressed together so as to cause them to grip the plural-ply wiping element 2.

When the sides 5 of the holder are thus pressed together the portion of the wiping element 2 between the ribs 4 will be compressed, said ribs forming indentations 12 in the opposite sides of the wiping element. This compressing of the plural-ply wiping element 2 by the ribs 4 along a median portion of said wiping element distorts the various plies somewhat with the result that the free or wiping edges 9 of the plies will tend to separate slightly, as shown best in Fig. 1, and the opposite edges 10 of the plies which are located within the holder also tend to separate, although since these edges 10 are confined within the U-shaped holder the latter will limit the amount of separation.

The ribs 4 which are thus pressed into the sides of the wiping element 2 are formed with the inwardly-facing shoulders 11 each of which has a sharp corner, and the distortion of the wiping element resulting from the compression thereof between the ribs 4 tends to expand the portion of the wiping element within the holder over the sharp corners of said shoulders so that said shoulders, together with the expanded portion of the wiping element, resist any tendency for the wiping element to be pulled out of the holder. As a result my improvements provide means for securely retaining the flexible wiping element within the holder. The expanding or slight separation of the wiping edges 9 of the plies 3 is an advantage because in a plural-ply wiping element a better wiping effect is produced where the wiping edges are slightly separated. The separation of the wiping edges enables the wiper to more effectively pick up moisture on the windshield, and the movement of the successive slightly-separated plies over the windshield produces an accumulative wiping effect which is more effective in cleaning the glass than where a single-ply wiper is used.

While I have shown herein the interior ribs 4 as being formed by folding narrow marginal portions of the strip 6 back onto the body thereof, yet these ribs with the inwardly-facing shoulder might be formed some other way without departing from the invention, the important thing being that the backing member 1 has a narrow rib 4 on its inner face at each edge of each leg 5, each rib preferably having an inwardly-facing shoulder such as the shoulder 11.

I claim:—

A wiper blade for windshield wipers comprising a holder of sheet metal having a U shape in cross section and having a narrow marginal portion of each side folded back against the inner face of the holder thereby forming at each edge of the holder, a narrow inside rib having an inwardly facing shoulder with a sharp corner and a plural-ply wiping element retained by said holder, one edge of said wiping element being received within the holder and the other edge projecting beyond the holder, the intermediate portion of the wiping element being compressed between the ribs and the portion within the holder being expanded over the sharp corners of the ribs, thereby locking the wiping element in the holder.

LOUIS ZAIGER.